United States Patent

Aste et al.

[11] Patent Number: 6,021,334
[45] Date of Patent: Feb. 1, 2000

[54] METHOD FOR TRANSMISSION BY A BASE STATION EQUIPPED WITH A MULTI-ELEMENT ANTENNA TO A MOBILE

[75] Inventors: Thierry Aste, Caluire; Luc Fety, Fontenay Sous Bois; Philippe Forster, Aulnay Sous Bois; Sylvie Mayrargue, Paris, all of France

[73] Assignee: France Telecom, Paris, France

[21] Appl. No.: 08/965,501

[22] Filed: Nov. 6, 1997

[30] Foreign Application Priority Data

Nov. 7, 1996 [FR] France ................................... 96 13597

[51] Int. Cl.[7] .............................. H04B 1/10; H04Q 7/20; H04Q 7/30
[52] U.S. Cl. ................................ 455/562; 455/63; 455/69
[58] Field of Search ...................... 455/561, 562, 455/277.1, 277.2, 278.1, 63, 65, 69; 342/457; 375/346, 347

[56] References Cited

U.S. PATENT DOCUMENTS

| | | | |
|---|---|---|---|
| 5,274,844 | 12/1993 | Harrison et al. | 455/25 |
| 5,515,378 | 5/1996 | Roy, III et al. | |
| 5,546,090 | 8/1996 | Roy, III et al. | 342/174 |
| 5,557,640 | 9/1996 | Chadwick | 375/229 |
| 5,710,995 | 1/1998 | Akaiwa et al. | 455/277.2 |
| 5,875,216 | 2/1999 | Martin | 375/347 |
| 5,887,037 | 3/1999 | Golden et al. | 375/347 |
| 5,893,033 | 4/1999 | Keskitalo et al. | 455/437 |
| 5,930,243 | 7/1999 | Parish et al. | 370/334 |

FOREIGN PATENT DOCUMENTS 0 639 035  2/1995  European Pat. Off. .

OTHER PUBLICATIONS

Adaptive Transmitting Antenna Methods for Multipath Environments, Derek Gerlach and Arogyaswami Paulraj Globecom 1994, pp. 425–429.
French Search Report dated Jul. 18, 1997, French Appl No. FR 9613597 filed Nov. 7, 1996.

Primary Examiner—William G. Trost
Assistant Examiner—Alan Gantt
Attorney, Agent, or Firm—Marshall, O'Toole, Gerstein, Murray & Borun

[57] ABSTRACT

According to this method for transmitting a digital signal by a base station equipped with a multi-element antenna to a mobile, in the presence of interference sources and background noise, at least one frequency transposition operator is calculated which approximately transforms one reception calibration table into one transmission or reception calibration table; statistical data are calculated on the basis of the signals received by the various elements, originating from the mobile and the interference sources; for this mobile, an optimum set of spatial weightings is calculated on the basis of the statistical data, the frequency transposition operator, and a criterion for reinforcing the useful signal and reducing the interference sources; the digital signal is weighted on the basis of the optimum set of weightings, then it is transmitted.

27 Claims, 1 Drawing Sheet

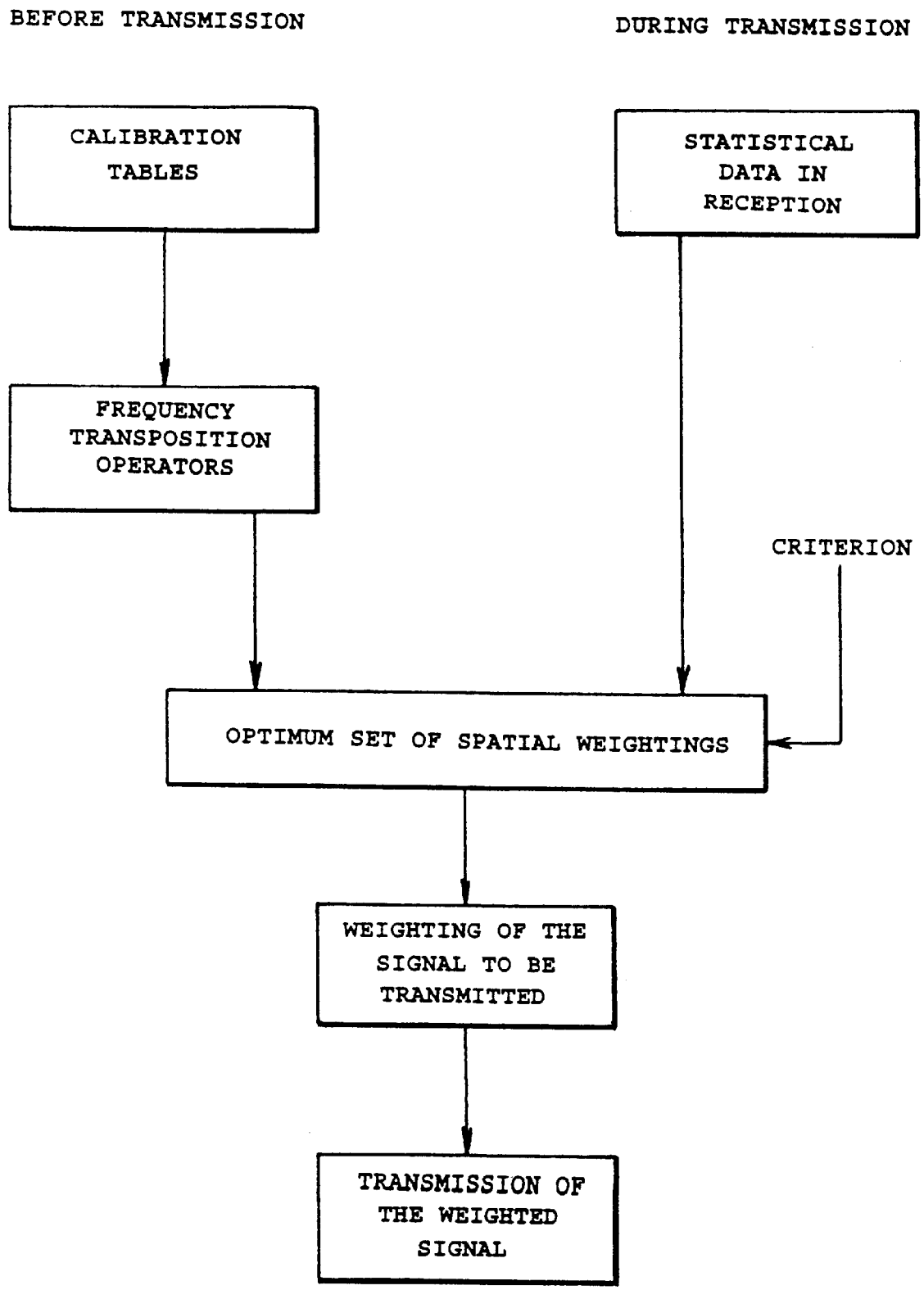

METHOD FOR TRANSMISSION BY A BASE STATION EQUIPPED WITH A MULTI-ELEMENT ANTENNA TO A MOBILE

FIELD OF THE INVENTION

The present invention relates to a method for transmission by a base station equipped with an antenna having a plurality of elements, or "multi-element" antenna, to a mobile.

It applies, in particular, to the field of mobile radio communications, and to a method for sending a digital signal between a base station and a specific mobile in the presence of interference sources and background noise.

The invention relates more particularly to sending over the so-called down link, that is to say the transmission of a digital signal from the base station to the mobile. For this purpose, the invention uses data obtained from sending over the so-called up link relating to the same base station, that is to say from signals which are received by the multi-element antenna of this station and originate from the mobile and the interference sources.

Throughout the rest of the text, "frequency" indicates "carrier frequency", "antenna" indicates "multi-element antenna of the base station", "transmission" and "reception" respectively indicate "transmission by the antenna" and "reception by the antenna" and "sending" indicates "transmission and/or reception".

"Useful mobile" indicates "mobile to which the method according to the present invention is applied" and "interference source" indicates "any factor which makes a contribution to the component representing the noise in the digital signal which is sent, with the exclusion of the background noise". For example, a mobile other than the useful mobile may constitute an interference source for the useful mobile.

"Frame" indicates "sequence of consecutive samples of a signal, sufficient in number to allow calculation of the required statistical data" (these statistical data will be explained below).

BACKGROUND OF THE INVENTION

Mobile radio communications is currently growing at such a rate that there is a desire to increase the number of users served simultaneously in a given radio communications network. The approach generally adopted for this is to optimize the use of the spectrum of the available transmission and reception frequencies.

In a radio communications network of the cellular type, it is, in particular, possible to allow a plurality of mobiles to communicate simultaneously by allocating them the same frequency in the same cell of the network: this is the object of the technique referred to as SDMA (Space Division Multiple Access).

In this case, use is generally made of an antenna whose radiation diagram has at least one lobe. The antenna creates energy minima in reception and transmission to the mobiles, other than the useful mobile, which share the same frequency with it and constitute interference sources for this useful mobile.

Signal processing methods, applied to multi-element antennas, are known which make it possible to improve the reception by acting on the up link.

However, the steps and the parameters involved in the known methods generally depend on the nature of the propagation channels observed on the various elements of the antenna. However, these channels are themselves, in particular, dependent on the carrier frequency. When the down link uses a frequency different from that of the up link, the weightings calculated and applied to the signals received by the various elements for the up link cannot generally be reused for the down link.

In an article entitled "Adaptive transmitting antenna methods for multipath environments", Globecom'94, pages 425–429, D. GERLACH and A. PAULRAJ describe a method for spatial filtering in transmission, applied to a multi-element antenna. This method has a number of limitations and drawbacks.

Firstly, it assumes that there is no intersymbol interference, which is not necessarily the case in practice.

Furthermore, in order to have information on the nature of the propagation channels of the down link, this prior method requires feedback from the mobile in question, that is to say the base station periodically sends test signals to the mobile, which measures them and sends the result of the measurement back to the base station. The presence of a delay between the feedback and the retransmission by the base station imposes some degree of time stability on the quantities which are measured. The number of measurements to be sent as feedback increases if the nature of the propagation channels changes rapidly. Thus, the amount of feedback which is needed may be extremely high. Even if attempts are made to reduce it, this amount of feedback necessarily limits the rate of useful information sent.

SUMMARY OF THE INVENTION

The object of the present invention is to overcome the aforementioned drawbacks.

More particularly, one object of the present invention is to improve the transmission by suppressing the general interference level during sending, by reinforcing the relative influence of the energy transmitted by the antenna to the useful mobile, and by limiting the relative influence of the energy transmitted by the antenna to the interference sources.

In particular, the present invention has two applications to a cellular mobile radio communications network. On the one hand, in an urban environment, the invention makes it possible to increase the rate of reuse of the frequencies over the cells as a whole, which makes it possible to increase the number of network users served simultaneously, by virtue of the reduction in the general level of interference. On the other hand, the invention makes it possible to increase the range of the antenna. As a consequence, in a rural environment, the invention makes it possible to limit the number of base stations needed to cover a given region.

In order to achieve the object mentioned above, the present invention proposes a method for transmitting a digital signal composed of successive frames of samples, by a base station equipped with a multi-element antenna to a specific mobile, in the presence of interference sources and background noise, with the aid of at least one reception carrier frequency and at least one transmission carrier frequency, according to which:

prior to sending:
(a) for each reception carrier frequency, a reception calibration table is developed, representing the variation in contribution, as a function of the reception direction, of the various reception elements at the said reception carrier frequency;
(b) for each transmission carrier frequency, a transmission calibration table is developed, representing the variation in contribution, as a function of the transmission direction, of the various transmission elements at the said transmission carrier frequency;

(c) at least one frequency transposition operator is calculated which approximately transforms one said reception calibration table into one said transmission or reception calibration table;

then, during sending:

(d) statistical data are calculated on the basis of a plurality of samples of a plurality of frames of the signals received by the various elements, originating from the mobile and the interference sources;

(e) for the said mobile, an optimum set of spatial weightings is calculated on the basis of the said statistical data, the said frequency transposition operator or operators, and a criterion for reinforcing the useful signal and reducing the interference sources;

(f) the contributions to the said digital signal to be transmitted by each element are respectively weighted by the weightings obtained on the basis of the spatial weightings of the said optimum set; and (g) the said digital signal thus weighted is transmitted.

BRIEF DESCRIPTION OF THE DRAWING

Other characteristics and advantages of the present invention will emerge from reading the following description of particular embodiments which are given by way of non-limiting examples.

The description refers to the single FIGURE which accompanies it and which constitutes a flow chart summarizing the successive steps of the method according to the present invention, in one particular embodiment.

DETAILED DESCRIPTION OF THE PREFERRED EMBODIMENTS

The case of a base station equipped with an antenna having N elements will be considered below.

The term "reception directional vector" (or "transmission directional vector") is used to denote a column vector having N components in which the $m^{th}$ component represents the signal which would be received (or transmitted) by the $m^{th}$ element, m varying from 1 to N, in the case of receiving (or transmitting) a plane wave of given frequency coming from (or transmitted in) a direction defined by a given angle.

As mentioned in the introduction, the method according to the present invention uses data obtained from sending over the up link, that is to say in reception. It is the up link which will be referred to below.

$S_{\lambda,r}(\alpha)$ denotes the reception directional vector relating
to the direction defined by the angle $\alpha$, and
to the carrier wavelength $\lambda=c/f$, in which c denotes the velocity of light and f denotes the carrier frequency.

For example, in the case of a linear antenna having omnidirectional elements of unit gain distributed uniformly with a separation d, $$S_1(\alpha) = \begin{pmatrix} 1 \\ \exp(2\pi jd/\lambda\cos\alpha) \\ \cdot \\ \cdot \\ \cdot \\ \exp(2\pi j(N-1)d/\lambda\cos\alpha) \end{pmatrix}$$

in which exp denotes the exponential function and j denotes the complex number satisfying $j^2=1$.

Let X(t) be a column vector having N components in which the $m^{th}$ component represents the signal received at time t from the mobiles by the $m^{th}$ element of the antenna, for m varying from 1 to N, this signal being transferred to the baseband.

It is assumed that P mobiles are each transmitting a message $s_k(t)$ which reaches the antenna via multiple paths of directions $\alpha_{k,i}$, propagation delays $\tau_{k,i}$ and complex amplitudes $amp_{k,i}$ at a frequency $f=c/\lambda$.

Then $$X(t) = \sum_{k=1}^{P} \sum_{i} S_\lambda(\alpha_{k,i}) \cdot amp_{k,i} \cdot s_k(t - \tau_{k,i})$$

in which i denotes the index of the paths assigned to the mobiles, in which $amp_{k,i} = AMP_{k,i} \cdot \exp(-2\pi jft_{k,i})$, in which $AMP_{k,i}$ denotes the modulus of the complex amplitude $amp_{k,i}$, and in which the term $\exp(-2\pi jft_{k,i})$ originates from the fact that the signal X(t) is in the baseband.

It can be seen that X(t) depends on frequency through the directional vectors $S_\lambda(\alpha)$ and through the phases of the complex amplitudes $amp_{k,i}$ exclusively.

For linear modulations, each message $s_k(t)$ is of the form $$s_k(t) = \sum_{n} a_{k,n} \cdot h_k(t - nT)$$

in which the coefficients $a_{k,n}$ represent the transmitted symbols, the $h_k$ represent the impulse responses of the transmission/reception equipment filters and T denotes the duration of a symbol.

Let $X(t) = [x_1(t), \ldots, x_N(t)]^T$ in which $(.)^T$ denotes the transpose matrix and in which $x_m(t)$, for m varying from 1 to N, denotes the $m^{th}$ component of X(t).

For m varying from 1 to N, then $$x_m(t) = \sum_{k=1}^{P} \sum_{n} a_{k,n} \cdot g_{k,m}(t - nT)$$

in which $g_{k,m}$ denotes the impulse response of the combination of the equipment filters and the multi-path propagation channel between the $k^{th}$ mobile and the $m^{th}$ element of the antenna.

When the data are sampled, for example at a symbol rate of 1/T in a particular embodiment, then this gives, for each sampling time lT, in which l is an integer, $$x_m(lT) = \sum_{k=1}^{P} \Sigma_n a_{k,n} \cdot g_{k,m}((l-n) \cdot T)$$

$$= \sum_{k=1}^{P} \Sigma_n a_{k,l-n} \cdot g_{k,m}(nT)$$

$$= \sum_{k=1}^{P} \Sigma_n a_{k,l-n} \cdot g_{k,m,n}$$

It can be seen that the received data sampled on an element are the sum of the contributions of the various mobiles, each contribution being a version, filtered by a digital channel, of the symbols transmitted by the various mobiles. The number of terms in a summation over n, reduced by 1, represents the length of the intersymbol interference relating to the $k^{th}$ mobile.

Let $\bar{R}_{xx}=X(t).X^+(t)$, in which $(.)^+$ denotes the conjugate transpose matrix and in which t describes a set of samples of a frame of the digital signal.

Let $R_{xx}$ be the mean of the matrices $\bar{R}_{xx}$ over a set of M, not necessarily consecutive, frames received by the antenna, M being small enough for the angles of arrival, on the various elements of the antenna, of the multiple paths originating from the mobile to be stable.

It is easy to show, assuming that, during the period in which the mean $R_{xx}$ of the matrices $\bar{R}_{xx}$ is taken,
  (i) the angular characteristics of the propagation do not vary;
  (ii) the arguments of the complex amplitudes $amp_{k,i}$ vary randomly in the interval $[0,2\pi]$;
  (iii) the moduli of the complex amplitudes $amp_{k,i}$, that is to say the energy of the multiple paths, do not vary;
  (iv) the variations in the delays of the multiple paths are negligible compared with the duration T of a symbol;
that the mean matrix $R_{xx}$ then converges to a matrix $$E(X(lT) \cdot X^+(lT)) = \sum_{k=1}^{P} \sum_{i} S_\lambda(\alpha_{k,i}) \cdot A \cdot S_\lambda^+(\alpha_{k,i})$$

in which $A=|amp_{k,i}|^2 \cdot |s_k(lT-\tau_{k,i})|^2$,
in which $|.|^2$ denotes the square of the modulus of a complex number,
and in which E denotes the mathematical expectation.

The matrix $E(X(lT).X^+(lT))$ is independent of the frames in question. The matrix $R_{xx}$ is assumed to be an estimate thereof.

It can be seen that taking the mean of $\bar{R}_{xx}$ over a suitable number of frames has the effect of making the phase terms of the complex amplitudes $amp_{k,i}$ of the multiple paths vanish. Assuming, in addition, that the powers $|amp_{k,i}|^2$ of the multiple paths are independent of frequency, the matrix $R_{xx}$ then depends on frequency through the directional vectors $S_\lambda(\alpha_{k,i})$ only. This property of the matrix $R_{xx}$, calculated on the basis of a plurality of samples of a plurality of frames, makes it possible to employ the frequency transposition operators which were mentioned above and are described in more detail below.

The term "calibration table" is used to describe the set of directional vectors relating to a given antenna geometry.

In the rest of the text, a digital signal composed of successive frames of samples will be considered. The method according to the present invention consists in transmitting this signal by a base station equipped with a multi-element antenna to a useful mobile, in the presence of interference sources and background noise. It is assumed that the up link uses at least one frequency, referred to as the reception carrier frequency, and that the down link uses at least one frequency, referred to as the transmission carrier frequency.

As shown by the single FIGURE, calibration tables are developed before sending.

For each reception carrier frequency, a reception calibration table is developed, representing the variation in contribution, as a function of the reception direction, of the various reception elements at the said reception carrier frequency.

In one particular embodiment, in order to develop each reception calibration table, a matrix is formed in which each column is a directional vector in which the $m^{th}$ component represents the signal which would be received by the $m^{th}$ element, m varying from 1 to N in which N is the number of elements, in the case of receiving a plane wave of frequency equal to the said carrier frequency and originating from a direction defined by a predetermined angle intrinsic to the said directional vector.

For each transmission carrier frequency, a transmission calibration table is developed, representing the variation in contribution, as a function of the transmission direction, of the various transmission elements to the said transmission carrier frequency.

In one particular embodiment, in order to develop each transmission calibration table, a matrix is formed in which each column is a directional vector in which the $m^{th}$ component represents the signal which would be transmitted by the $m^{th}$ element, m varying from 1 to N in which N is the number of elements, in the case of transmitting a plane wave of frequency equal to the said carrier frequency in a direction defined by a predetermined angle intrinsic to the said directional vector.

Next, a respective correction factor is applied, if appropriate, to each element of the calibration tables which are obtained, in order to take account of various characteristics of instruments contained in the transmission chain and in the reception chain. This set of correction factors may thereafter be updated periodically on the basis of the change in a plurality of measured physical parameters.

As indicated by the FIGURE, the next step in the method according to the invention consists in calculating one or more linear matrix operators, referred to as frequency transposition operators. It can in fact be shown that there is a linear operator which approximately transforms a reception calibration table into a transmission or reception calibration table.

The approximation which is used may be the least squares approximation or any other suitable approximation.

Then, during sending, as shown by the FIGURE, statistical data, on the up link, are calculated on the basis of a plurality of samples of a plurality of frames of the signals received by the various elements, originating from the mobile and the interference sources.

These statistical data are advantageously of order 2. However, they may be of higher order.

In a first particular embodiment, employing a single reception carrier frequency $f_1$ and a single transmission carrier frequency $f_2$, the step of calculating the frequency transposition operators consists in calculating a single frequency transposition matrix operator $T_{f_1,f_2}$ which transforms the reception calibration table $C_1$ associated with the frequency $f_1$ into the transmission calibration table $C_2$ associated with the frequency $f_2$.

In the same particular embodiment, the step of calculating the statistical data consists for each frame of a set of M, not necessarily consecutive, frames received by the antenna, M being small enough for the angles of arrival, on the various elements of the antenna, of the multiple paths originating from the mobiles to be stable:
  in calculating a matrix $\bar{R}_{xx}^{f_1}=X_{f_1}(t).X_{f_1}^+(t)$,
    in which $X_{f_1}(t)$ is a vector having N components in which the $m^{th}$ component represents, at the carrier frequency $f_1$, the signal received at time t from the mobiles by the $m^{th}$ element of the antenna, for m varying from 1 to N,
    in which $(.)^+$ denotes the conjugate transpose matrix, and
    in which t describes a set of samples of the said frame, and
    in estimating a matrix $\bar{R}_{vv}^{f_1}$, either on the basis of the contributions of the interference sources and the background noise on each of the N elements of the antenna, or on the basis of the useful signal received by these elements;

then:

in calculating the mean of the M matrices $\overline{R}_{xx}^{f1}$ so as to obtain an autocorrelation matrix $R_{xx}^{f1}$ which is an estimate of $E(X_{f1}(t).X_{f1}^+(t))$, in which E denotes the mathematical expectation, and in calculating the mean of the M matrices $\overline{R}_{vv}^{f1}$ so as to obtain an autocorrelation matrix $R_{vv}^{f1}$ which is an estimate of $E(V_{f1}(t).V_{f1}^+(t))$, in which $V_{f1}(t)$ is a vector having N components in which the $m^{th}$ component represents, at the carrier frequency $f_1$, either the contribution of the interference sources and the background noise on the $m^{th}$ element of the antenna, or the useful signal received by this element, for m varying from 1 to N.

In a second particular embodiment, employing a plurality of reception carrier frequencies $f_{qr}$ and a plurality of transmission carrier frequencies $f_{qe}$, each frame of the digital signal being sent with the aid of a different carrier frequency, subject to a periodic repetition, the step of calculating the calibration tables consists furthermore in developing, for an arbitrarily chosen reception carrier frequency $f_{qOr}$ a reception calibration table $C_{qOr}$, representing the variation in contribution, as a function of the reception direction, of the various reception elements at the reception carrier frequency $f_{qor}$.

In this second particular embodiment, the step of calculating the frequency transposition operators consists:

for each reception carrier frequency $f_{qr}$, in calculating a frequency transposition matrix operator $T_{fqr,fqOr}$ which transforms the reception calibration table $C_{qr}$ associated with the frequency $f_{qr}$ into the reception calibration table $C_{qOr}$ associated with the frequency $f_{qOr}$;

for each transmission carrier frequency $f_{qe}$, in calculating a frequency transposition matrix operator $T_{fqOr, fqe}$ which transforms the calibration table $C_{qOr}$ associated with the frequency $f_{qOr}$ into the calibration table $C_{qe}$ associated with the frequency $f_{qe}$.

Still in the second particular embodiment, the step of calculating statistical data consists for each frame of a set of K, not necessarily consecutive, frames received by the antenna, K being small enough for the angles of arrival, on the various elements of the antenna, of the multiple paths originating from the mobiles to be stable:

in calculating a matrix $\overline{R}_{xx}^{fqr} = X_{fqr}(t).X_{fqr}^+(t)$, in which $X_{fqr}(t)$ is a vector having N components in which the $m^{th}$ component represents, at the carrier frequency $f_{qr}$, the signal received at time t from the mobiles by the $m^{th}$ element of the antenna, for m varying from 1 to N, and in which t describes a set of samples of the said frame, and in estimating a matrix $\overline{R}_{vv}^{fqr}$, either on the basis of the contributions of the interference sources and the background noise on each of the N elements of the antenna, or on the basis of the useful signal received by these elements; then:

in calculating the mean of the K matrices $\overline{R}_{xx}^{fqr}$ so as to obtain an autocorrelation matrix $_{xx}^{fqr}$ which is an estimate of $E(X_{fqr}(t).X_{fqr}^+(t))$ and in calculating the mean of the K matrices $\overline{R}_{vv}^{fqr}$ so as to obtain an autocorrelation matrix $R_{vv}^{fqr}$ which is an estimate of $E(V_{fqr}(t).V_{fqr}^+(t))$, in which $V_{fqr}(t)$ is a vector having N components in which the $m^{th}$ component represents, at the carrier frequency $f_{qr}$, either the contribution of the interference sources and the background noise on the $m^{th}$ element of the antenna, or the useful signal received by this element, for m varying from 1 to N.

In the two particular embodiments above, the respective numbers of frames M and K depend, in particular, on the speed of the mobile: the greater the speed, the smaller the number of frames available. Conversely, for a mobile at so-called moderate speed, for example a cyclist or a pedestrian who is running, it will be possible to perform the calculations over a larger number of frames.

In the aforementioned first embodiment, in the presence of P mobiles containing one useful mobile with which communication is to be established, the other P-1 mobiles constituting interference sources, the matrix $\overline{R}_{vv}^{f1}$ may be established either on the basis of the contributions of the interference sources and the background noise on the various elements of the antenna, or on the basis of the useful signal received by the various elements.

When the matrix $\overline{R}_{vv}^{f1}$ is established on the basis of the contributions of the interference sources and background noise, one possibility for estimating the matrix $\overline{R}_{vv}^{f1}$ is that the impulse response $\{g_{k,m,1}, \ldots, g_{k,m,L}\}$, in which L is an integer, of the propagation channel connecting the $k^{th}$ mobile to the $m^{th}$ element of the antenna, is determined for k varying from 1 to P and m varying from 1 to N;

spatial correlation matrices having N rows and $$\sum_{\substack{k=1 \\ k \neq j}}^{P} \sum_{i=1}^{L} G_{k,i} \cdot G_{k,i}^+$$

are formed in which the $j^{th}$ mobile is the useful mobile, in which $G_{k,i}$ is the column vector $[g_{k,1,i}, \ldots, g_{k,N,i}]^T$ and in which $(.)^T$ denotes the transpose matrix;

the mean of these spatial correlation matrices is taken over a predetermined number of frames of the signal;

for m varying from 1 to N, the variance $\sigma_{I,m}^2$ of the background noise on the $m^{th}$ element is estimated;

the mean matrix of the spatial correlation matrices is added to a diagonal matrix in which, for m varying from 1 to N, the term located on the $m^{th}$ row and in the $m^{th}$ column is the variance $\sigma_{I,m}^2$, the sum matrix obtained constituting the matrix $\overline{R}_{vv}^{f1}$.

For the last step, the variance $\sigma_{I,m}^2$ may be replaced by any other suitable constant.

An alternative possibility for estimating the matrix $\overline{R}_{vv}^{f1}$, still when it is established on the basis of the contributions of the interference sources and the background noise on the various elements of the antenna, is that with the aid of a learning sequence of $L_{ref}$ samples, for m varying from 1 to N, the impulse response of the propagation channel connecting the mobile to the $m^{th}$ element of the antenna is estimated in terms of the least squares approximation, the residue $b_m$ of this estimation being a column vector constituting an estimate of the contribution of the interference sources and the background noise on the $m^{th}$ element;

the matrix B having the N vectors $b_m^T$ as rows is formed;

the expression $(1/L_B).B.B^+$ is calculated, in which $L_B$ denotes the number of columns of the matrix B, the matrix obtained constituting the matrix $\overline{R}_{vv}^{f1}$.

When the matrix $\overline{R}_{vv}^{f1}$ is established on the basis of the useful signal received by the various elements of the antenna, on e possibility for estimating $\overline{R}_{vv}^{f1}$ is that the impulse response $\{g_{m,1}, \ldots, g_{m,L}\}$, in which L is an integer, of the propagation channel connecting the mobile to the $m^{th}$ element of the antenna is determined for m varying from 1 to N;

spatial correlation matrices having N rows and N columns $$\sum_{i=1}^{L} G_i \cdot G_i^+$$

are formed in which $G_i$ is the column vector $[g_{1,i}, \ldots, g_{N,i}]^T$;

the mean of these spatial correlation matrices is taken over a predetermined number of frames of the signal, the matrix obtained constituting the matrix $\overline{R}_{vv}^{f1}$.

An alternative possibility for estimating the matrix $\overline{R}_{vv}^{f1}$, still when it is established on the basis of the useful signal received by the various elements of the antenna, is that with the aid of a learning sequence of $L_{ref}$ samples, for m varying from 1 to N, the impulse response $\{g_{m,1}, \ldots, g_{m,L}\}$, in which L is an integer, of the propagation channel connecting the mobile to the $m^{th}$ element of the antenna is estimated in terms of the least squares approximation;

spatial correlation matrices having N rows and N columns $$\sum_{i=1}^{L} G_i \cdot G_i^+$$

are formed in which $G_i$ is the column vector $[g_{1,i}, \ldots, g_{N,i}]^T$;

the mean of these spatial correlation matrices is taken over a predetermined number of frames of the signal, the matrix obtained constituting the matrix $\overline{R}_{vv}^{f1}$.

Similarly, in the aforementioned second embodiment, in the presence of P mobiles containing a useful mobile with which communication is to be established, the other P-1 mobiles constituting the interference sources, the matrix $\overline{R}_{vv}^{fqr}$ may be established either on the basis of the contributions of the interference sources and the background noise on the various elements of the antenna, or on the basis of the useful signal received by the various elements.

When the matrix $\overline{R}_{vv}^{fqr}$ is established on the basis of the contributions of the interference sources and the background noise, one possibility for estimating the matrix $\overline{R}_{vv}^{fqr}$ is that the impulse response $\{g_{k,m,1}, \ldots, g_{k,m,L}\}$, in which L is an integer, of the propagation channel connecting the $k^{th}$ mobile to the $m^{th}$ element of the antenna, is determined for k varying from 1 to P and m varying from 1 to N;

spatial correlation matrices having N rows and N columns $$\sum_{\substack{k=1 \\ k \neq j}}^{P} \sum_{i=1}^{L} G_{k,i} \cdot G_{k,i}^+$$

are formed in which the $j^{th}$ mobile is the useful mobile,
in which $G_{k,i}$ is the column vector $[g_{k,1,i}, \ldots, g_{k,N,i}]^T$
and in which $(.)^T$ denotes the transpose matrix;

the mean of these spatial correlation matrices is taken over a predetermined number of frames of the signal;

for m varying from 1 to N, the variance $\sigma_{I,m}^2$ of the background noise on the $m^{th}$ element is estimated;

the mean matrix of the spatial correlation matrices is added to a diagonal matrix in which, for m varying from 1 to N, the term located on the $m^{th}$ row and in the $m^{th}$ column is the variance $\sigma_{I,m}^2$, the sum matrix obtained constituting the matrix $\overline{R}_{vv}^{fqr}$.

For the last step, the variance $\sigma_{I,m}^2$ may be replaced by any other suitable constant.

An alternative possibility for estimating the matrix $\overline{R}_{vv}^{fqr}$, still when it is established on the basis of the contributions of the interference sources and the background noise on the various elements of the antenna, is that with the aid of a learning sequence of $L_{ref}$ samples, for m varying from 1 to N, the impulse response of the propagation channel connecting the mobile to the $m^{th}$ element of the antenna is estimated in terms of the least squares approximation, the residue $b_m$ of this estimation being a column vector constituting an estimate of the contribution of the interference sources and the background noise on the $m^{th}$ element;

the matrix B having the N vectors $b_m^T$ as rows is formed;

the expression $(1/L_B).B.B^+$ is calculated, in which $L_B$ denotes the number of columns of the matrix B, the matrix obtained constituting the matrix $\overline{R}_{vv}^{fqr}$.

When the matrix $\overline{R}_{vv}^{fqr}$ is established on the basis of the useful signal received by the various elements of the antenna, one possibility for estimating $\overline{R}_{vv}^{fqr}$ is that the impulse response $\{g_{m,1}, \ldots, g_{m,L}\}$, in which L is an integer, of the propagation channel connecting the mobile to the $m^{th}$ element of the antenna is determined for m varying from 1 to N;

spatial correlation matrices having N rows and N columns $$\sum_{i=1}^{L} G_i \cdot G_i^+$$

are formed in which $G_i$ is the column vector $[g_{1,i}, \ldots, g_{N,i}]^T$;

the mean of these spatial correlation matrices is taken over a predetermined number of frames of the signal, the matrix obtained constituting the matrix $\overline{R}_{vv}^{fqr}$.

An alternative possibility for estimating the matrix $\overline{R}_{vv}^{fqr}$, still when it is established on the basis of the useful signal received by the various elements of the antenna, is that with the aid of a learning sequence of $L_{ref}$ samples, for m varying from 1 to N, the impulse response $\{g_{m,1}, \ldots, g_{m,L}\}$, in which L is an integer, of the propagation channel connecting the mobile to the $m^{th}$ element of the antenna is estimated in terms of the least squares approximation;

spatial correlation matrices having N rows and N columns $$\sum_{i=1}^{L} G_i \cdot G_i^+$$

are formed in which $G_i$ is the column vector $[g_{1,i}, \ldots, g_{N,i}]^T$;

the mean of these spatial correlation matrices is taken over a predetermined number of frames of the signal, the matrix obtained constituting the matrix $\overline{R}_{vv}^{fqr}$.

As indicated by the FIGURE, the next step in the method according to the present invention consists in calculating, for the useful mobile, an optimum set of spatial weightings on the basis of the statistical data and the frequency transposition operator or operators obtained previously, and on the basis of a criterion for reinforcing the useful signal and reducing the interference sources.

Next, the contributions to the digital signal to be transmitted by each element are respectively weighted by the weightings obtained on the basis of the spatial weightings of the optimum set.

Finally, the digital signal thus weighted is transmitted.

In the aforementioned first particular embodiment, the three steps which have just been described (namely calculating an optimum set of spatial weightings, weighting the signal to be transmitted and transmitting the weighted signal) may be carried out as follows:

a spatial weighting vector $w_{f1}$ is calculated so that the matrices $R_{xx}^{f1}$, $R_{vv}^{f1}$ and the vector $w_{f1}$ satisfy a suitable criterion for reinforcing the useful signal and reducing the interference sources;

the inverse, denoted $T_{f1,f2}^{-1}$, of the frequency transposition operator is applied to the weighting vector $w_{f1}$ so as to obtain the optimum set of spatial weightings in the form of a vector $w_{f2} = T_{f1,f2}^{-1} . W_{f1}$;

for m varying from 1 to N, the signal to be transmitted by the $m^{th}$ element of the antenna to the mobile is multiplied by the $m^{th}$ component of the conjugate transposed optimum weighting vector $W_{f2}^+$.

In this embodiment, when the autocorrelation matrix $R_{vv}^{f1}$ is established on the basis of the contributions of the interference sources and the background noise on the various elements of the antenna, the criterion consists in choosing for the weighting vector $w_{f1}$ the vector $w_{f1}$ which minimizes the ratio $(w_{f1}^+ . R_{vv}^{f1} . w_{f1})/(w_{f1}^+ . R_{xx}^{f1} . w_{f1})$, and when the autocorrelation matrix $R_{vv}^{f1}$ is established on the basis of the useful signal received by the various elements of the antenna, the criterion consists in choosing for the weighting vector $w_{f1}$ the vector $w_{f1}$ which maximizes the ratio $(w_{f1}^+ . R_{vv}^{f1} . w_{f1})/(w_{f1}^+ . R_{xx}^{f1} . w_{f1})$.

As a variant, in the first embodiment, the same three steps may be carried out as follows:

the frequency transposition operator $T_{f1,f2}$ is applied to the matrix $R_{xx}^{f1}$ so as to obtain a matrix $)R_{xx}^{f2} = T_{f1,f2} . R_{xx}^{f1} . T_{f1,f2}^+$;

the frequency transposition operator $T_{f1,f2}$ is applied to the matrix $R_{vv}^{f1}$ so as to obtain a matrix $R_{vv}^{f2} = T_{f1,f2} . R_{vv}^{f1} . T_{f1,f2}^+$;

the optimum set of spatial weightings is calculated in the form of a vector $w_{f2}$ so that the matrices $R_{xx}^{f2}$, $R_{vv}^{f2}$ and the vector $w_{f2}$ satisfy a suitable criterion for reinforcing the useful signal and reducing the interference sources;

for m varying from 1 to N, the signal to be transmitted by the $m^{th}$ element of the antenna to the mobile is multiplied by the $m^{th}$ component of the conjugate transposed optimum weighting vector $w_{f2}^+$.

In this variant, when the autocorrelation matrix $R_{vv}^{f1}$ is established on the basis of the contributions of the interference sources and the background noise on the various elements of the antenna, the criterion consists in choosing for the optimum weighting vector $w_{f2}$ the vector $w_{f2}$ which minimizes the ratio $(w_{f2}^+ . R_{vv}^{f2} . w_{f2})/(w_{f2}^+ . R_{xx}^{f2} . w_{f2})$, and when the autocorrelation matrix $R_{vv}^{f1}$ is established on the basis of the useful signal received by the various elements of the antenna, the criterion consists in choosing for the optimum weighting vector $w_{f2}$ the vector $w_{f2}$ which maximizes the ratio $(w_{f2}^+ . R_{vv}^{f2} . w_{f2})/(w_{f2}^+ . R_{xx}^{f2} . w_{f2})$.

In the aforementioned second particular embodiment, the same three steps may be carried out as follows:

for the reception carrier frequency $f_{qOr}$, a spatial weighting vector $w_{fqOr}$ is calculated so that the matrices $R_{xx}^{fqOr}$, $R_{vv}^{fqOr}$ and the vector $w_{fqOr}$ satisfy a suitable criterion for reinforcing the useful signal and reducing the interference sources;

for each transmission carrier frequency $f_{qe}$, the inverse, denoted $T_{fqOr,fqe}^{-1}$, of the frequency transposition operator is applied to the weighting vector $w_{fqOr}$ so as to obtain the optimum set of spatial weightings in the form of a vector $w_{fqe} = T_{fqOr,fqe}^{-1} . w_{fqOr}$;

for m varying from 1 to N, the signal to be transmitted at the transmission carrier frequency $f_{qe}$ by the $m^{th}$ element of the antenna to the mobile is multiplied by the $m^{th}$ component of the conjugate transposed optimum weighting vector $w_{fqe}^+$.

In this embodiment, when the autocorrelation matrix $R_{vv}^{fqr}$ is established on the basis of the contributions of the interference sources and the background noise on the various elements of the antenna, the criterion consists in choosing for the weighting vector $w_{fqOr}$ the vector $w_{fqOr}$ which minimizes the ratio $(w_{fqOr}^+ . R_{vv}^{fqOr} . w_{fqOr})/(w_{fqOr}^+ . R_{xx}^{fqOr} . w_{fqOr})$, and when the autocorrelation matrix $R_{vv}^{fqr}$ is established on the basis of the useful signal received by the various elements of the antenna, the criterion consists in choosing for the optimum weighting vector $w_{fqOr}$ the vector $w_{fqOr}$ which maximizes the ratio $(w_{fqOr}^+ . R_{vv}^{fqOr} . w_{fqOr})/(w_{fqOr}^+ . R_{xx}^{fqOr} . w_{fqOr})$.

As a variant, in the second embodiment, the same three steps may be carried out as follows:

the K corresponding frequency transposition operators $T_{fqr,fqOr}$ are applied respectively to the K matrices $\overline{R}_{xx}^{fqr}$ so as to obtain K matrices $\overline{R}_{xx}^{fqOr} = T_{fqr,fqOr} . \overline{R}_{xx}^{fqr} . T_{fqr,fqOr}^+$;

the K frequency transposition operators $T_{fqr,fqOr}$ are applied respectively to the K matrices $\overline{R}_{vv}^{fqr}$ so as to obtain K matrices $\overline{R}_{vv}^{fqOr} = T_{fqr,fqOr} . \overline{R}_{vv}^{fqr} . T_{fqr,fqOr}^+$;

the mean $R_{xx}^{fqOr}$ of the K matrices $\overline{R}_{xx}^{fqOr}$ and the mean $R_{vv}^{fqOr}$ of the K matrices $\overline{R}_{vv}^{fqOr}$ are calculated;

for each transmission carrier frequency $f_{qe}$, the frequency transposition operator $T_{fqOr,fqe}$ is applied to the mean matrix $R_{vv}^{fqOr}$ so as to obtain a matrix $R_{xx}^{fqe} = T_{fqOr,fqe} . R_{xx}^{fqOr} . T_{fqOr,fqe}^+$;

for each transmission carrier frequency $f_{qe}$, the frequency transposition operator $T_{fqOr,fqe}$ is applied to the mean matrix $R_{vv}^{fqOr}$ so as to obtain a matrix $R_{vv}^{fqe} = T_{fqOr,fqe} . R_{vv}^{fqOr} . T_{fqOr,fqe}^+$;

for each transmission carrier frequency $f_{qe}$, the optimum set of spatial weightings is calculated in the form of a vector $w_{fqe}$ so that the matrices $R_{xx}^{fqe}$, $R_{vv}^{fqe}$ and the vector $w_{fqe}$ satisfy a suitable criterion for reinforcing the useful signal and reducing the interference sources;

for m varying from 1 to N, the signal to be transmitted at the transmission carrier frequency $f_{qe}$ by the $m^{th}$ element of the antenna to the mobile is multiplied by the $m^{th}$ component of the conjugate transposed optimum weighting vector $w_{fqe}^+$.

In this variant, when the autocorrelation matrix $R_{vv}^{fqr}$ is established on the basis of the contributions of the interference sources and the background noise on the various elements of the antenna, the criterion consists in choosing for the optimum weighting vector $w_{fqe}$ the vector $w_{fqe}$ which minimizes the ratio $(w_{fqe}^+ . R_{vv}^{fqe} . w_{fqe})/(w_{fqe}^+ . R_{xx}^{fqe} . w_{fqe})$, and when the autocorrelation matrix $R_{vv}^{fqr}$ is established on the basis of the useful signal received by the various elements of the antenna, the criterion consists in choosing for the optimum weighting vector $w_{fqe}$ the vector $w_{fqe}$ which maximizes the ratio $(w_{fqe}^+ . R_{vv}^{fqe} . w_{fqe})/(w_{fqe}^+ . R_{xx}^{fqe} . w_{fqe})$.

In yet another embodiment, the frequency transposition operator (step c of the method) is implicit. The approach is then as follows. A set of weightings $w_{fqr}$ which is optimum at the reception frequency is determined. The set of weightings at the transmission frequency is then calculated by adjusting, in terms of least squares, the antenna diagram $W^*_{fqe} S_{\lambda e}(\alpha)$ at $f_{qe}$ to the antenna diagram $W^*_{fqr} S_\lambda(\alpha)$ at the reception frequency $f_{qr}$.

The weightings thus obtained are equal to $T^*_{fqefqr} W_{fqr}$ in which $T_{fqefqr}$ is the frequency transposition matrix from $f_{qe}$ to $f_{qr}$.

From the point of view of implementation means, functions and results, a variant of this type is fully equivalent to the one defined in detail above.

What we claim is:

1. Method for transmitting a digital signal composed of successive frames of samples, by a base station equipped with a multi-element antenna to a specific mobile, in the presence of interference sources and background noise, with the aid of at least one reception carrier frequency and at least one transmission carrier frequency, according to which:

prior to sending:
   (a) for each reception carrier frequency, a reception calibration table is developed, representing the variation in contribution, as a function of the reception direction, of the various reception elements at the said reception carrier frequency;
   (b) for each transmission carrier frequency, a transmission calibration table is developed, representing the variation in contribution, as a function of the transmission direction, of the various transmission elements at the said transmission carrier frequency;
   (c) at least one frequency transposition operator is calculated which approximately transforms one said reception calibration table into one said transmission or reception calibration table;

then, during sending:
   (d) statistical data are calculated on the basis of a plurality of samples of a plurality of frames of the signals received by the various elements, originating from the mobile and the interference sources;
   (e) for the said mobile, an optimum set of spatial weightings is calculated on the basis of the said statistical data, the said frequency transposition operator or operators, and a criterion for reinforcing the useful signal and reducing the interference sources;
   (f) the contributions to the said digital signal to be transmitted by each element are respectively weighted by the weightings obtained on the basis of the spatial weightings of the said optimum set; and
   (g) the said digital signal thus weighted is transmitted.

2. Method according to claim 1, wherein, in order to develop each said reception calibration table,
   (a1) a matrix is formed in which each column is a directional vector in which the $m^{th}$ component represents the signal which would be received by the $m^{th}$ element, m varying from 1 to N in which N is the number of elements, in the case of receiving a plane wave of frequency equal to the said carrier frequency and originating from a direction defined by a predetermined angle intrinsic to the said directional vector.

3. Method according to claim 1, wherein, in order to develop each said transmission calibration table,
   (b1) a matrix is formed in which each column is a directional vector in which the $m^{th}$ component represents the signal which would be transmitted by the $m^{th}$ element, m varying from 1 to N in which N is the number of elements, in the case of transmitting a plane wave of frequency equal to the said carrier frequency in a direction defined by a predetermined angle intrinsic to the said directional vector.

4. Method according to claim 1, wherein
   (c1) the said operator performs an approximate transformation of the least squares approximation type.

5. Method according claim 1, wherein
   (d1) the said statistical data are calculated with an order of at least 2.

6. Method according to claim 1, employing a single reception carrier frequency $f_1$ and a single transmission carrier frequency $f_2$, wherein
   (c1) a single frequency transposition matrix operator $T_{f1,f2}$ is calculated which transforms the reception calibration table $C_1$ associated with the frequency $f_1$ into the transmission calibration table $C_2$ associated with the frequency $f_2$;
   (d1) for each frame of a set of M, not necessarily consecutive, frames received by the antenna, M being small enough for the angles of arrival, on the various elements of the antenna, of the multiple paths originating from the mobiles to be stable:
   a matrix $\overline{R}_{xx}^{f1} = X_{f1}(t) . X_{f1}^+(t)$ is calculated, in which $X_{f1}(t)$ is a vector having N components in which the $m^{th}$ component represents, at the carrier frequency $f_1$, the signal received at time t from the mobiles by the $m^{th}$ element of the antenna, for m varying from 1 to N,
   in which $(.)^+$ denotes the conjugate transpose matrix, and
   in which t describes a set of samples of the said frame, and
   a matrix $R_{vv}^{f1}$ is estimated, either on the basis of the contributions of the interference sources and the background noise on each of the N elements of the antenna, or on the basis of the useful signal received by these elements; then:
   the mean of the said M matrices $\overline{R}_{xx}^{f1}$ is calculated so as to obtain an autocorrelation matrix $R_{xx}^{f1}$ which is an estimate of $E(X_{f1}(t).X_{f1}^+(t))$, in which E denotes the mathematical expectation, and
   the mean of the said M matrices $\overline{R}_{vv}^{f1}$ is calculated so as to obtain an autocorrelation matrix $R_{vv}^{f1}$ which is an estimate of $E(V_{f1}(t).V_{f1}^+(t))$, in which $V_{f1}(t)$ is a vector having N components in which the $m^{th}$ component represents, at the carrier frequency $f_1$, either the contribution of the interference sources and the background noise on the $m^{th}$ element of the antenna, or the useful signal received by this element, for m varying from 1 to N.

7. Method according claim 6, wherein
   (e1) a spatial weighting vector $w_{f1}$ is calculated so that the matrices $R_{xx}^{f1}$, $R_{vv}^{f1}$ and the vector $w_{f1}$ satisfy a suitable criterion for reinforcing the useful signal and reducing the interference sources;
   (e2) the inverse, denoted $T_{f1,f2}^{-1}$, of the frequency transposition operator is applied to the weighting vector $w_{f1}$ so as to obtain the said optimum set of spatial weightings in the form of a vector $w_{f2} = T_{f1,f2}^{-1} . w_{f1}$;

(f1) for m varying from 1 to N, the signal to be transmitted by the $m^{th}$ element of the antenna to the mobile is multiplied by the $m^{th}$ component of the conjugate transposed optimum weighting vector $w_{f2}^{+}$.

8. Method according to claim 7, in which the autocorrelation matrix $R_{vv}^{f1}$ is established on the basis of the contributions of the interference sources and the background noise on the various elements of the antenna, wherein
   (e11) the said criterion consists in choosing for the weighting vector $w_{f1}$ the vector $w_{f1}$ which minimizes the ratio $(w_{f1}^{+}.R_{vv}^{f1}.w_{f1})/(w_{f1}^{+}.R_{xx}^{f1}.w_{f1})$.

9. Method according to claim 7, in which the autocorrelation matrix $R_{vv}^{f1}$ is established on the basis of the useful signal received by the various elements of the antenna, wherein
   (e11) the said criterion consists in choosing for the weighting vector $w_{f1}$ the vector $w_{f1}$ which maximizes the ratio $(w_{f1}^{+}.R_{vv}^{f1}.w_{f1})/(w_{f1}^{+}.R_{xx}^{f1}.w_{f1})$.

10. Method according to claim 6, wherein
   (e1) the frequency transposition operator $T_{f1,f2}$ is applied to the matrix $R_{xx}^{f1}$ so as to obtain a matrix $R_{xx}^{f2}=T_{f1,f2}.R_{xx}^{f1}.T_{f1,f2}^{+}$;
   (e2) the frequency transposition operator $T_{f1,f2}$ is applied to the matrix $R_{vv}^{f1}$ so as to obtain a matrix $R_{vv}^{f2}=T_{f1,f2}.R_{vv}^{f1}.T_{f1,f2}^{+}$;
   (e3) the said optimum set of spatial weightings is calculated in the form of a vector $w_{f2}$ so that the matrices $R_{xx}^{f2}$, $R_{vv}^{f2}$ and the vector $w_{f2}$ satisfy a suitable criterion for reinforcing the useful signal and reducing the interference sources;
   (f1) for m varying from 1 to N, the signal to be transmitted by the $m^{th}$ element of the antenna to the mobile is multiplied by the $m^{th}$ component of the conjugate transposed optimum weighting vector $w_{f2}^{+}$.

11. Method according to claim 10, in which the autocorrelation matrix $R_{vv}^{f1}$ is established on the basis of the contributions of the interference sources and the background noise on the various elements of the antenna, wherein
   (e33) the said criterion consists in choosing for the optimum weighting vector $w_{f2}$ the vector $w_{f2}$ which minimizes the ratio $(w_{f2}^{+}.R_{vv}^{f2}.w_{f2})/(w_{f2}^{+}.R_{xx}^{f2}.w_{f2})$.

12. Method according to claim 10, in which the autocorrelation matrix $R_{vv}^{f1}$ is established on the basis of the useful signal received by the various elements of the antenna, wherein
   (e33) the said criterion consists in choosing for the optimum weighting vector $w_{f2}$ the vector $w_{f2}$ which maximizes the ratio $(w_{f2}^{+}.R_{vv}^{f2}.w_{f2})/(w_{f2}^{+}.R_{xx}^{f2}.w_{f2})$.

13. Method according to claim 6 in the presence of P mobiles containing a useful mobile with which communication is to be established, the other P-1 mobiles constituting the interference sources, in which the matrix $\overline{R}_{vv}^{f1}$ is established on the basis of the contributions of the interference sources and the background noise on the various elements of the antenna, wherein, in order to estimate the matrix $\overline{R}_{vv}^{f1}$,
   (d11) the impulse response $\{g_{k,m,1}, \ldots, g_{k,m,L}\}$, in which L is an integer, of the propagation channel connecting the $k^{th}$ mobile to the md element of the antenna, is determined for k varying from 1 to P and m varying from 1 to N;
   (d12) spatial correlation matrices having N rows and N columns $$\sum_{\substack{k=1 \\ k \neq j}}^{P} \sum_{i=1}^{L} G_{k,i} \cdot G_{k,i}^{+}$$

are formed
   in which the $j^{th}$ mobile is the useful mobile,
   in which $G_{k,i}$ is the column vector $[g_{k,1,i}, \ldots, g_{k,N,i}]^T$
   and
   in which $(.)^T$ denotes the transpose matrix;
   (d13) the mean of these spatial correlation matrices is taken over a predetermined number of frames of the signal;
   (d14) for m varying from 1 to N, the variance $\sigma_{I,m}^{2}$ of the background noise on the $m^{th}$ element is estimated;
   (d15) the mean matrix obtained in step (d13) is added to a diagonal matrix in which, for m varying from 1 to N, the term located on the $m^{th}$ row and in the $m^{th}$ column is the variance $\sigma_{I,m}^{2}$, the sum matrix obtained constituting the matrix $\overline{R}_{vv}^{f1}$.

14. Method according to claim 6, in which the matrix $\overline{R}_{vv}^{f1}$ is established on the basis of the contributions of the interference sources and the background noise on the various elements of the antenna, wherein, in order to estimate the matrix $\overline{R}_{vv}^{f1}$,
   (d11) with the aid of a learning sequence of $L_{ref}$ samples, for m varying from 1 to N, the impulse response of the propagation channel connecting the mobile to the $m^{th}$ element of the antenna is estimated in terms of the least squares approximation, the residue $b_m$ of this estimation being a column vector constituting an estimate of the contribution of the interference sources and the background noise on the $m^{th}$ element;
   (d12) the matrix B having the N vectors $b_m^T$ as rows is formed;
   (d13) the expression $(1/L_B).B.B^{+}$ is calculated, in which $L_B$ denotes the number of columns of the matrix B, the matrix obtained constituting the matrix $\overline{R}_{vv}^{f1}$.

15. Method according to claim 6, in which the matrix $\overline{R}_{vv}^{f1}$ is established on the basis of the useful signal received by the various elements of the antenna, wherein, in order to estimate the matrix $\overline{R}_{vv}^{f1}$,
   (d11) the impulse response $\{g_{m,1}, \ldots, g_{m,L}\}$, in which L is an integer, of the propagation channel connecting the mobile to the $m^{th}$ element of the antenna is determined for m varying from 1 to N;
   (d12) spatial correlation matrices having N rows and N columns $$\sum_{i=1}^{L} G_i \cdot G_i^{+}$$

are formed
   in which $G_i$ is the column vector $[g_{1,i}, \ldots, g_{N,i}]^T$;
   (d13) the mean of these spatial correlation matrices is taken over a predetermined number of frames of the signal, the matrix obtained constituting the matrix $\overline{R}_{vv}^{f1}$.

16. Method according to claim 6, in which the matrix $R_{vv}^{f1}$ is established on the basis of the useful signal received by the various elements of the antenna, wherein, in order to estimate the matrix $\overline{R}_{vv}^{f1}$, (d11) with the aid of a learning sequence of $L_{ref}$ samples, for m varying from 1 to N, the impulse response $\{g_{m,1}, \ldots, g_{m,L}\}$, in which L is an integer, of the propagation channel connecting the mobile to the $m^{th}$ element of the antenna is estimated in terms of the least squares approximation;

(d12) spatial correlation matrices having N rows and N columns $$\sum_{i=1}^{L} G_i \cdot G_i^+$$

are formed
in which $G_i$ is the column vector $[g_{1,i}, \ldots, g_{N,i}]^T$;

(d13) the mean of these spatial correlation matrices is taken over a predetermined number of frames of the signal, the matrix obtained constituting the matrix $\overline{R}_{vv}^{f1}$.

17. Method according to claim 1, employing a plurality of reception carrier frequencies $f_{qr}$ and a plurality of transmission carrier frequencies $f_{qe}$, each frame of the said digital signal being sent with the aid of a different carrier frequency, subject to a periodic repetition, wherein (a1) furthermore, for an arbitrarily chosen reception carrier frequency $f_{qOr}$ a reception calibration table $C_{qOr}$ is developed, representing the variation in contribution, as a function of the reception direction, of the various reception elements at the said reception carrier frequency $f_{qOr}$;

(c1) for each said reception carrier frequency $f_{qr}$, a frequency transposition matrix operator $T_{fqr,fqOr}$ is calculated which transforms the reception calibration table $C_{qr}$ associated with the frequency $f_{qr}$ into the reception calibration table $C_{qOr}$ associated with the said frequency $f_{qOr}$;

(c2) for each said transmission carrier frequency $f_{qe}$, a frequency transposition matrix operator $T_{fqOr,fqe}$ is calculated which transforms the calibration table $C_{qOr}$ associated with the said frequency $f_{qOr}$ into the calibration table $C_{qe}$ associated with the frequency $f_{qe}$;

(d1) for each frame of a set of K, not necessarily consecutive, frames received by the antenna, K being small enough for the angles of arrival, on the various elements of the antenna, of the multiple paths originating from the mobiles to be stable:
a matrix $\overline{R}_{xx}^{fqr} = X_{fqr}(t) \cdot X_{fqr}^+(t)$ is calculated, in which $X_{fqr}(t)$ is a vector having N components in which the $m^{th}$ component represents, at the carrier frequency $f_{qr}$, the signal received at time t from the mobile by the $m^{th}$ element of the antenna, for m varying from 1 to N, and
in which t describes a set of samples of the said frame, and
a matrix $\overline{R}_{vv}^{fgr}$ is estimated, either on the basis of the contributions of the interference sources and the background noise on each of the N elements of the antenna, or on the basis of the useful signal received by these elements; then:
the mean of the said K matrices $\overline{R}_{vv}^{fgr}$ is calculated so as to obtain an autocorrelation matrix $R_{xx}^{fqr}$ which is an estimate of $E(X_{fqr}(t) \cdot X_{fqr}^+(t))$, and
the mean of the said K matrices $\overline{R}_{vv}^{fgr}$ is calculated so as to obtain an autocorrelation matrix $R_{vv}^{fqr}$ which is an estimate of $E(V_{fqr}(t) \cdot V_{fqr}^+$ (t)), in which $V_{fqr}(t)$ is a vector having N components in which the $m^{th}$ component represents, at the carrier frequency $f_{qr}$, either the contribution of the interference sources and the background noise on the $m^{th}$ element of the antenna, or the useful signal received by this element, for m varying from 1 to N.

18. Method according to claim 17, wherein (e1) for the said reception carrier frequency $f_{qOr}$, a spatial weighting vector $w_{fqOr}$ is calculated so that the matrices $R_{xx}^{fqOr}$, $R_{vv}^{fqOr}$ and the vector $w_{fqOr}$ satisfy a suitable criterion for reinforcing the useful signal and reducing the interference sources;

(e2) for each transmission carrier frequency $f_{qe}$, the inverse, denoted $T_{fqOr,fqe}^{-1}$, of the frequency transposition operator is applied to the weighting vector $w_{fqOr}$ so as to obtain the said optimum set of spatial weightings in the form of a vector $w_{fqe} = T_{fqOr,fqe}^{-1} \cdot w_{fqOr}$;

(f1) for m varying from 1 to N, the signal to be transmitted at the transmission carrier frequency $f_{qe}$ by the $m^{th}$ element of the antenna to the mobile is multiplied by the $m^{th}$ component of the conjugate transposed optimum weighting vector $w_{fqe}^+$.

19. Method according to claim 18, in which the autocorrelation matrix $R_{vv}^{fqr}$ is established on the basis of the contributions of the interference sources and the background noise on the various elements of the antenna, wherein (e11) the said criterion consists in choosing for the optimum weighting vector wfqOr the vector $w_{fqOr}$ which minimizes the ratio $(w_{fqOr}^+ \cdot R_{vv}^{fqOr} \cdot w_{fqOr})/(w_{fqOr}^+ \cdot R_{xx}^{fqOr} \cdot w_{fqOr})$.

20. Method according to claim 18, in which the autocorrelation matrix $R_{vv}^{fqr}$ is established on the basis of the useful signal received by the various elements of the antenna, wherein (e11) the said criterion consists in choosing for the optimum weighting vector $w_{fqOr}$ the vector $w_{fqOr}$ which minimizes the ratio $(w_{fqOr}^+ \cdot R_{vv}^{fqOr} \cdot w_{fqOr})/(w_{fqOr}^+ \cdot R_{xx}^{fqOr} \cdot w_{fqOr})$.

21. Method according to claim 17, wherein (e1) the K corresponding frequency transposition operators $T_{fqr,fqOr}$ are applied respectively to the said K matrices $\overline{R}_{xx}^{fqr}$ so as to obtain K matrices $\overline{R}_{xx}^{fqOr} = T_{fqr,fqOr} \cdot \overline{R}_{xx}^{fqr} \cdot T_{fqr,fqOr}^+$;

(e2) the said K frequency transposition operators $T_{fqr,fqOr}$ are applied respectively to the said K matrices $\overline{R}_{vv}^{fqr}$ so as to obtain K matrices $\overline{R}_{vv}^{fqOr} = T_{fqr,fqOr} \cdot \overline{R}_{vv}^{fqr} \cdot T_{fqr,fqOr}^+$;

(e3) the mean $R_{xx}^{fqOr}$ of the said K matrices $\overline{R}_{xx}^{fqOr}$ and the mean $R_{vv}^{fqOr}$ of the said K matrices $\overline{R}_{vv}^{fqOr}$ are calculated;

(e4) for each transmission carrier frequency $f_{qe}$, the frequency transposition operator $T_{fqOr,fqe}$ is applied to the mean matrix $R_{xx}^{fqOr}$ so as to obtain a matrix $R_{xx}^{fqe} = T_{fqOr,fqe} \cdot R_{xx}^{fqOr} \cdot T_{fqOr,fqe}^+$;

(e5) for each transmission carrier frequency $f_{qe}$, the frequency transposition operator $T_{fqOr,fqe}$ is applied to the mean matrix $R_{vv}^{fqOr}$ so as to obtain a matrix $R_{vv}^{fqe} = T_{fqOr,fqe} \cdot R_{vv}^{fqOr} \cdot T_{fqOr,fqe}^+$;

(e6) for each transmission carrier frequency $f_{qe}$, the said optimum set of spatial weightings is calculated in the form of a vector $w_{fqe}$ so that the matrices $R_{xx}^{fqe}$, $R_{vv}^{fqe}$ and the vector $w_{fqe}$ satisfy a suitable criterion for reinforcing the useful signal and reducing the interference sources;

(f1) for m varying from 1 to N, the signal to be transmitted at the transmission carrier frequency $f_{qe}$ by the $m^{th}$ element of the antenna to the mobile is multiplied by the $m^{th}$ component of the conjugate transposed optimum weighting vector $w_{fqe}^{+}$.

22. Method according to claim 21, in which the autocorrelation matrix $R_{vv}^{fqr}$ is established on the basis of the contributions of the interference sources and the background noise on the various elements of the antenna, wherein (e61) the said criterion consists in choosing for the optimum weighting vector $w_{fqe}$ the vector $w_{fqe}$ which minimizes the ratio $(w_{fqe}^{+}.R_{vv}^{fqe}.w_{fqe})/(wfqe^{+}.R_{xx}^{fqe}.w_{fqe})$.

23. Method according to claim 21, in which the autocorrelation matrix $R_{vv}^{fqr}$ is established on the basis of the useful signal received by the various elements of the antenna, characterized in that (e61) the said criterion consists in choosing for the optimum weighting vector $w_{fqe}$ the vector $w_{fqe}$ which maximizes the ratio $(w_{fqe}^{+}.R_{vv}^{fqe}.w_{fqe})/(wfqe^{+}.R_{xx}^{fqe}.w_{fqe})$.

24. Method according to claim 17 in the presence of P mobiles containing a useful mobile with which communication is to be established, the other P-1 mobiles constituting the interference sources, in which the matrix $\overline{R}_{vv}^{fqr}$ is established on the basis of the contributions of the interference sources and the background noise on the various elements of the antenna, wherein, in order to estimate the matrix $\overline{R}_{vv}^{fqr}$, (d11) the impulse response $\{g_{k,m,1}, \ldots, g_{k,m,L}\}$, in which L is an integer, of the propagation channel connecting the $k^{th}$ mobile to the $m^{th}$ element of the antenna, is determined for k varying from 1 to P and m varying from 1 to N;

(d12) spatial correlation matrices having N rows and N columns $$\sum_{\substack{i=1 \\ k \neq j}}^{P} \sum_{i=1}^{L} G_{k,i} \cdot G_{k,i}^{+}$$

are formed
in which the $j^{th}$ mobile is the useful mobile,
in which $G_{k,i}$ is the column vector $[g_{k,1,i}, \ldots, g_{k,N,i}]^T$
and in which $(.)^T$ denotes the transpose matrix;

(d13) the mean of these spatial correlation matrices is taken over a predetermined number of frames of the signal;

(d14) for m varying from 1 to N, the variance $\sigma_{I,m}^2$ of the background noise on the $m^{th}$ element is estimated;

(d15) the mean matrix obtained in step (d13) is added to a diagonal matrix in which, for m varying from 1 to N, the term located on the $m^{th}$ row and in the $m^{th}$ column is the variance $\sigma_{I,m}^2$, the sum matrix obtained constituting the matrix $\overline{R}_{vv}^{fqr}$.

25. Method according to claim 17, in which the matrix $\overline{R}_{vv}^{fqr}$ is established on the basis of the contributions of the interference sources and the background noise on the various elements of the antenna, wherein, in order to estimate the matrix $\overline{R}_{vv}^{fqr}$, (d11) with the aid of a learning sequence of $L_{ref}$ samples, for m varying from 1 to N, the impulse response of the propagation channel connecting the mobile to the $m^{th}$ element of the antenna is estimated in terms of the least squares approximation, the residue $b_m$ of this estimation being a column vector constituting an estimate of the contribution of the interference sources and the background noise on the $m^{th}$ element;

(d12) the matrix B having the N vectors $b_m^T$ as rows is formed;

(d13) the expression $(1/L_B).B.B^{+}$ is calculated, in which $L_B$ denotes the number of columns of the matrix B, the matrix obtained constituting the matri $\overline{R}_{vv}^{fqr}$.

26. Method according to claim 17, in which the matrix $\overline{R}_{vv}^{fqr}$ is established on the basis of the useful signal received by the various elements of the antenna, wherein, in order to estimate the matrix $\overline{R}_{vv}^{fqr}$, (d11) the impulse response $\{g_{m,i}, \ldots, g_{m,L}\}$, in which L is an integer, of the propagation channel connecting the mobile to the $m^{th}$ element of the antenna is determined for m varying from 1 to N;

(d12) spatial correlation matrices having N rows and N columns $$\sum_{i=1}^{L} G_i \cdot G_i^{+}$$

are formed
in which $G_i$ is the column vector $[g_{1,i}, \ldots, g_{N,i}]^T$;

(d13) the mean of these spatial correlation matrices is taken over a predetermined number of frames of the signal, the matrix obtained constituting the matrix $\overline{R}_{vv}^{fqr}$.

27. Method according to claim 17, in which the matrix $\overline{R}_{vv}^{fqr}$ is established on the basis of the useful signal received by the various elements of the antenna, wherein, in order to estimate the matrix $\overline{R}_{vv}^{fqr}$, (d11) with the aid of a learning sequence of $L_{ref}$ samples, for m varying from 1 to N, the impulse response $\{g_{m,1}, \ldots, g_{m,L}\}$, in which L is an integer, of the propagation channel connecting the mobile to the $m^{th}$ element of the antenna is estimated in terms of the least squares approximation;

(d12) spatial correlation matrices having N rows and N columns $$\sum_{i=1}^{L} G_i \cdot G_i^{+}$$

are formed
in which $G_i$ is the column vector $[g_{1,i}, \ldots, g_{N,i}]^T$;

(d13) the mean of these spatial correlation matrices is taken over a predetermined number of frames of the signal, the matrix obtained constituting the matrix $\overline{R}_{vv}^{fqr}$.

* * * * *